US008614718B2

(12) United States Patent
Rapo et al.

(10) Patent No.: US 8,614,718 B2
(45) Date of Patent: Dec. 24, 2013

(54) METHOD AND SYSTEM FOR PRODUCING A RICH MULTIMEDIA INTERACTION

(71) Applicant: Disney Enterprises, Inc., Burbank, CA (US)

(72) Inventors: Andrew Rapo, Studio City, CA (US); Christopher Thomes, Encino, CA (US); Allan Jones, Valencia, CA (US); Steven Parkis, Valencia, CA (US); Paul Yanover, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/894,287

(22) Filed: May 14, 2013

(65) Prior Publication Data

US 2013/0293562 A1 Nov. 7, 2013

Related U.S. Application Data

(63) Continuation of application No. 12/009,227, filed on Jan. 17, 2008, now Pat. No. 8,471,863.

(51) Int. Cl.
 *G09G 5/00* (2006.01)
(52) U.S. Cl.
 USPC .......................................... 345/581; 715/719
(58) Field of Classification Search
 USPC .......................................... 345/581; 715/719
 See application file for complete search history.

(56) References Cited

U.S. PATENT DOCUMENTS

| 6,078,942 A * | 6/2000 | Eisler et al. ................... 718/100 |
| 7,383,504 B1 * | 6/2008 | Divakaran et al. ............. 715/723 |
| 2004/0210923 A1 * | 10/2004 | Hudgeons et al. ............... 725/24 |
| 2005/0102324 A1 * | 5/2005 | Spring et al. ............... 707/104.1 |
| 2006/0253436 A1 * | 11/2006 | Cook et al. ......................... 707/3 |

* cited by examiner

*Primary Examiner* — Maurice L McDowell, Jr.
(74) *Attorney, Agent, or Firm* — Farjami & Farjami LLP

(57) ABSTRACT

There is provided a method of producing a rich multimedia interaction comprising identifying a theme of the rich multimedia interaction, determining its dynamic display attributes based on the theme, determining a cooperation protocol governing interplay amongst the dynamic display attributes, and designating a background. The method further comprises selecting a display motif of the rich multimedia interaction, and generating the rich multimedia interaction for display, using one or more sub-applications configured to apply the cooperation protocol to the dynamic display attributes to produce enhanced dynamic display attributes and to adapt the enhanced dynamic display attributes to the display motif and integrate the enhanced dynamic display attributes with the background. A system for producing a rich multimedia interaction comprises a rich multimedia interaction host server, a publication database storing elements suitable for use by an interaction software application, and the interaction software application stored on a data storage unit.

20 Claims, 6 Drawing Sheets

METHOD AND SYSTEM FOR PRODUCING A RICH MULTIMEDIA INTERACTION

This application is a Continuation of U.S. application Ser. No. 12/009,227, filed Jan. 17, 2008, which is hereby incorporated by reference in its entirety.

BACKGROUND OF THE INVENTION

1. Field of the Invention

The present invention relates generally to the production of entertainment content. More particularly, the present invention relates to the production of computer mediated interactive entertainment content.

2. Background Art

Websites such as MySpace and YouTube have demonstrated the rapid ascendancy of computers and the Internet as preferred providers of topical information, entertainment content, and social interaction. These popular Internet resources show that as the demographic of computer users has broadened and diversified to include a youthful, technologically sophisticated population, greater importance is placed on computer mediated virtual communities as sources of social networking opportunities. The increasingly demanding group of young computer users who frequent these virtual forums insist upon access to frequently updated content, and have progressively higher expectations of the richness of the computer mediated entertainment found there.

Content providers, seeking to design computer applications to meet these ever loftier consumer expectations, quickly found the conventional Hypertext Markup Language (HTML) data format too constraining. As a result, more and more web content has been developed using data formats better enabling of the dynamic, rich media experience preferred by content consumers, such as Extensible Markup Language (XML), for example. Use of these versatile data formats, together with embedded graphics applications such as Flash, for instance, have aided content providers in delivering enhanced graphical entertainment content to consumers.

Despite these improvements in displaying entertainment content, many computer entertainment platforms utilizing graphics applications such as Flash have been designed to deliver content, however sophisticated, as one-way presentations to a largely passive audience. The increasingly engaged and interactive character of the present day audience, however, makes this unilateral presentation format somewhat obsolete. One conventional way in which content providers have attempted to compensate for the interactive deficiency of their products within the established presentation format, is by diversifying the variety of content available to users of a single website or software application. Although perhaps effective in catering to a broader spectrum of entertainment tastes, this approach fails to remedy the deficiencies in a content delivery framework premised on passive consumption of a pre-formulated entertainment product.

Alternatively, a conventional approach to accommodating user preferences for interactive computer entertainment invites a computer user to become actively involved in a predetermined entertainment experience, perhaps by playing a computer game, or by entering a virtual music studio to create a personal audio mix, for example. The conventional interactive entertainment products offered under this approach, however, tend to be highly focused on a specific type of entertainment content, i.e. games and music in particular examples cited. Consequently, this conventional approach, while providing an interactive entertainment experience, may do so at the cost of content variety, and responsiveness to rapidly changing consumer tastes.

Attempts to merge these two alternative conventional approaches have encountered thus far largely unmet challenges arising from the complexity of delivering content that is concurrently interactive, diverse, and quickly responsive to shifting consumer preferences. Accordingly, there is a need to overcome the drawbacks and deficiencies in the art by providing a solution enabling a content delivery framework providing rich multimedia interactions that are varied, topical, and flexible in the face of changes in consumer interest.

SUMMARY OF THE INVENTION

A method and system for producing a rich multimedia interaction, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
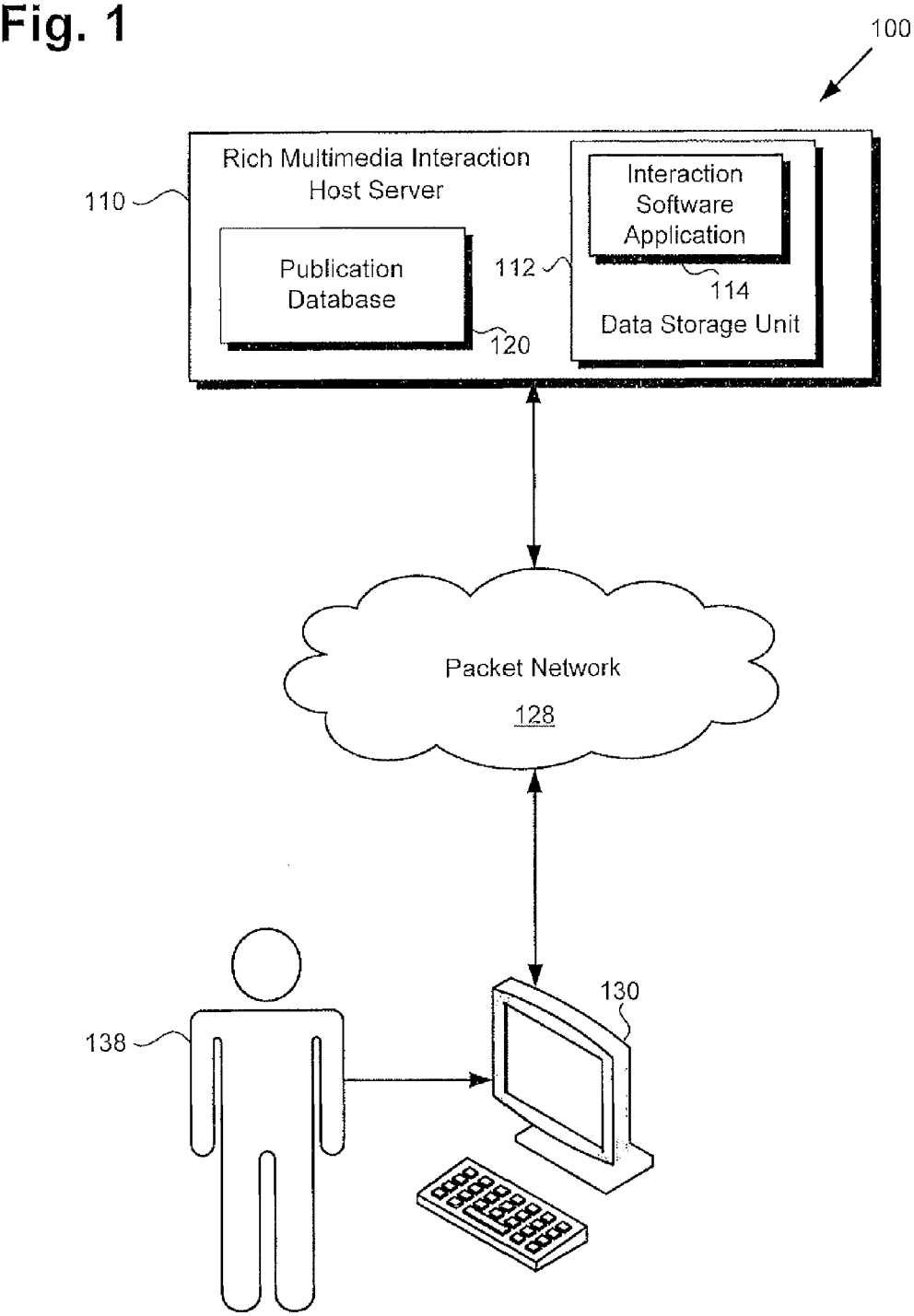
FIG. 1 shows a diagram of an exemplary system for producing a rich multimedia interaction, according to one embodiment of the present invention.

The present application is directed to a method and system for producing a rich multimedia interaction. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a diagram of an exemplary system for producing a rich multimedia interaction, according to one embodiment of the present invention. In the embodiment of FIG. 1, system 100 comprises rich multimedia interaction host server 110 including data storage unit 112 storing interaction software application 114, and publication database 120. Also shown in FIG. 1 are packet network 128, client computer 130, and user 138.

According to the embodiment of FIG. 1, user 138, who may be a creator of rich multimedia interaction content or a consumer of such content, may utilize client computer 130 and packet network 128 to access interaction software application 114 in data storage unit 112. User 138 may then use interaction software application 114 to produce a rich multimedia interaction, or to interact with a rich multimedia interaction produced by another user. Where user 138 is a creator of rich multimedia interaction content, the particular rich multimedia interaction produced by user 138 may be stored in data storage unit 112 or on client computer 130 for enjoyment by user 138 or other users.

In one embodiment, the rich multimedia interaction produced using interaction software application 114 may be hosted for the enjoyment and evaluation of a community of users, i.e., other users such as user 138. In that embodiment, for example, the rich multimedia interaction may be stored in publication database 120, for example, and hosted to an online community on rich multimedia interaction host server 110, accessible through packet network 128. There, members of the online community may enjoy the rich multimedia interaction produced by user 138, and indicate their level of enjoyment by providing a rating feedback. Similarly, user 138 may access rich multimedia interactions produced by other users and stored on rich multimedia interaction host server 110, and provide a rating feedback.

In another embodiment, system 100 might be utilized to modify a rich multimedia interaction to make the experience more personal to user 138. In that embodiment, user 138 might personalize the appearance, greeting, or dynamic display attributes associated with the rich multimedia interaction, for example. For instance, a user of an interactive entertainment channel devoted to music, television, movies, online chat, or games may modify the size and position of a dynamic display attribute in the form of a video player, for example. It is noted that although client computer 130 is represented as a personal computer (PC) in FIG. 1, in one embodiment client computer 130 may be a mobile communication device such as a mobile telephone, a digital media player, personal digital assistant (PDA), a wireless computer, or a wireless gaming console, for example.

As shown in FIG. 1, interactive software application 114, which may be an Extensible Markup Language (XML) based application, can be accessed through packet network 128. In that instance, interactive software application 114 may comprise a web application, accessible over a packet network such as the Internet, for example. Alternatively, interactive software application 114 may reside on a server supporting a local area network (LAN), for instance, or included in another type of limited distribution network. In another embodiment, data storage unit 112 containing interactive software application 114 may comprise a portable computer readable storage medium such as a compact disc read-only memory (CD-ROM). Analogously, in another embodiment, publication database 120 may reside on a server supporting a LAN or other limited distribution network.

Figure 2:
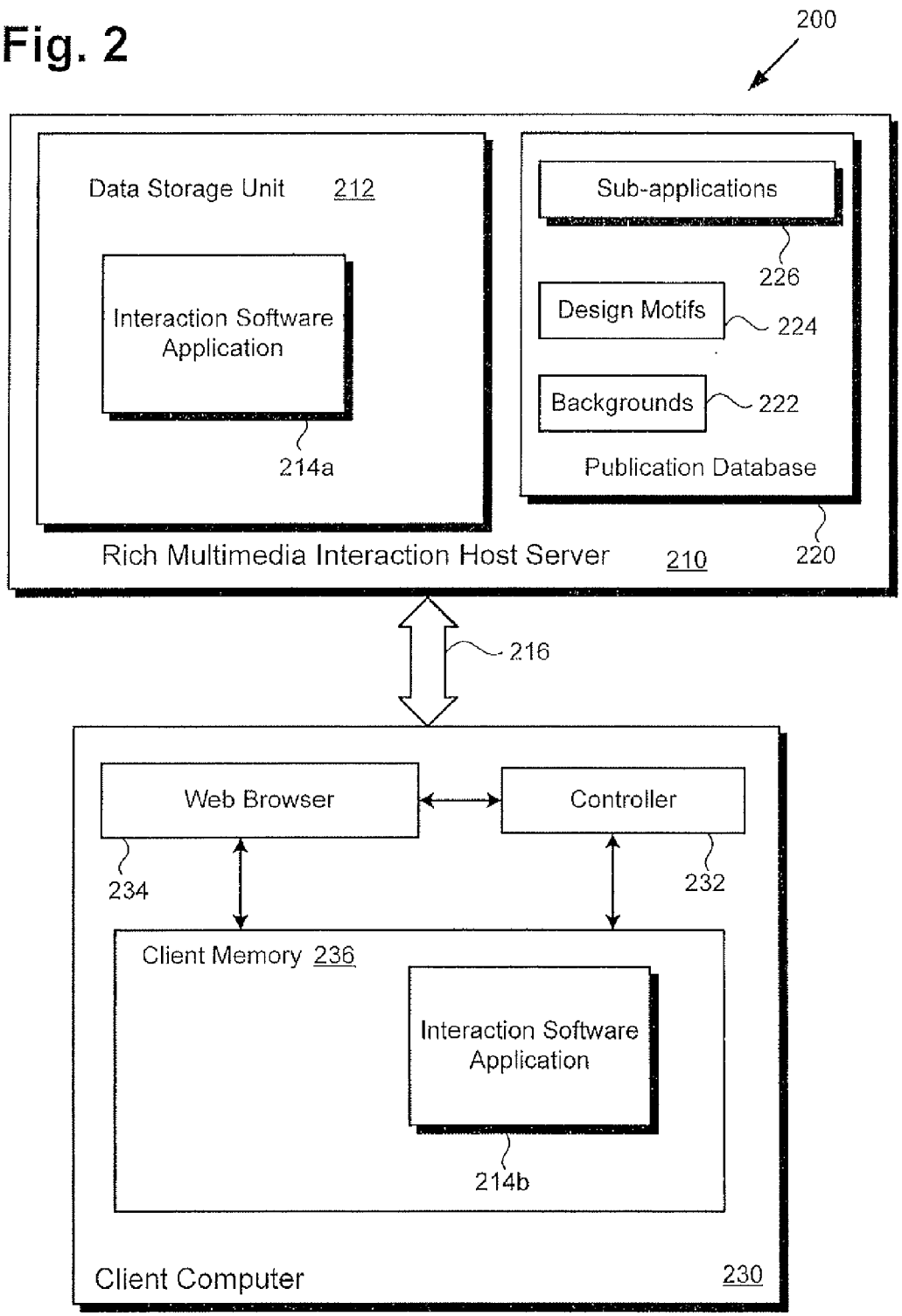
FIG. 2 shows a more detailed exemplary embodiment of a system for producing a rich multimedia interaction, according to one embodiment of the present invention.

Turning now to FIG. 2, FIG. 2 provides a more detailed embodiment showing exemplary system 200 for producing a rich multimedia interaction. System 200 in FIG. 2 includes client computer 230 receiving a download via communication link 216 from rich multimedia interaction host server 210 including data storage 212 and publication database 220. Client computer 230 corresponds to client computer 130, in FIG. 1. As shown in FIG. 2, client computer 230 comprises controller 232, web browser 234, and client memory 236.

Rich multimedia interaction host server 210, data storage unit 212, and publication database 220 correspond respectively to rich multimedia interaction server 110, data storage unit 112, and publication database 120, in FIG. 1. As shown in FIG. 2, data storage unit 212 includes interaction software application 214a, corresponding to interaction software application 114 in FIG. 1. Moreover, in FIG. 2, publication database 220 comprises data files dedicated to backgrounds 222, design motifs 224, and sub-applications 226, for production of rich multimedia interactions. Also shown in FIG. 2 is interactive software application 214b.

In the present embodiment, interactive software application 214b is located in client memory 236, having been received from rich multimedia interaction host server 210 via communication link 216. In the embodiment of FIG. 2, communication link 216 represents download of interaction software application 214a over a packet network, for example. In another embodiment, communication link 216 may represent transfer of interaction software application 214a from a CD-ROM or other portable computer readable storage medium. Once transferred, interaction software application 214b may be stored in client memory 236 and run locally on client computer 230. It is noted that communication link 216 is shown as a two-way communication, to correspond to ongoing communication with publication database 220 residing on rich multimedia interaction host server 210.

Controller 232 may be the central processing unit for client computer 230, for example, in which role controller 232 runs the client computer operating system, launches web browser 234, and facilitates execution of interaction software application 214b. Web browser 234, under the control of controller 232, may execute software application 214b to enable a user of client computer 230 to produce one or more rich multimedia interactions.

Implementation of the embodiment of FIG. 2 permits a user of client computer 230 to launch interaction software application 214b and thereby identify a desired rich multimedia interaction, determine dynamic display attributes such as a navigation tool or video player to be included in the identified rich multimedia interaction, and further determine a cooperation protocol governing interplay amongst the dynamic display attributes. In addition, a user of client computer 230 may designate a background 222 and select a display motif 224 of the rich multimedia interaction and call one or more sub-applications 226 corresponding to the determined dynamic display attributes, from publication database 220.

It is noted that sub-applications 226 comprise mini computer applications subsidiary to interaction software application 214a and 214b, and configured to apply the cooperation protocol to the dynamic display attributes to produce enhanced dynamic display attributes and to adapt the enhanced dynamic display attributes to the display motif and integrate the enhanced dynamic display attributes with the background, under the control of the interaction software application. The rich multimedia interaction may thereby be generated for display. It is further noted that sub-applications 226 are versatile, and may be readily re-programmed to enable rapid development and modification of rich multimedia interactions, permitting the produced interactive content to remain topical and responsive to changes in user interests.

Figure 3:
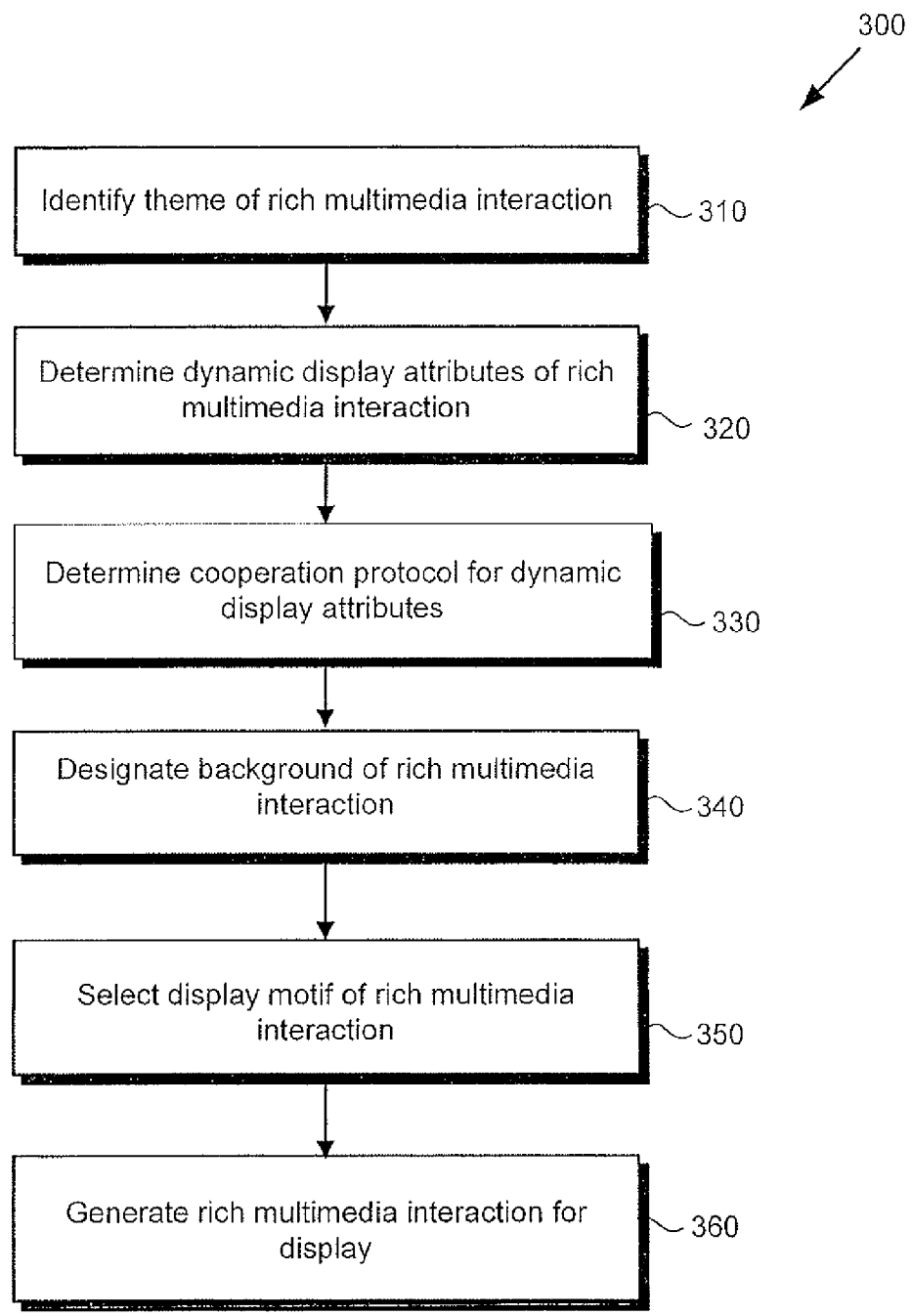
FIG. 3 is a flowchart presenting a method of producing a rich multimedia interaction, according to one embodiment of the present invention.
Figure 4:
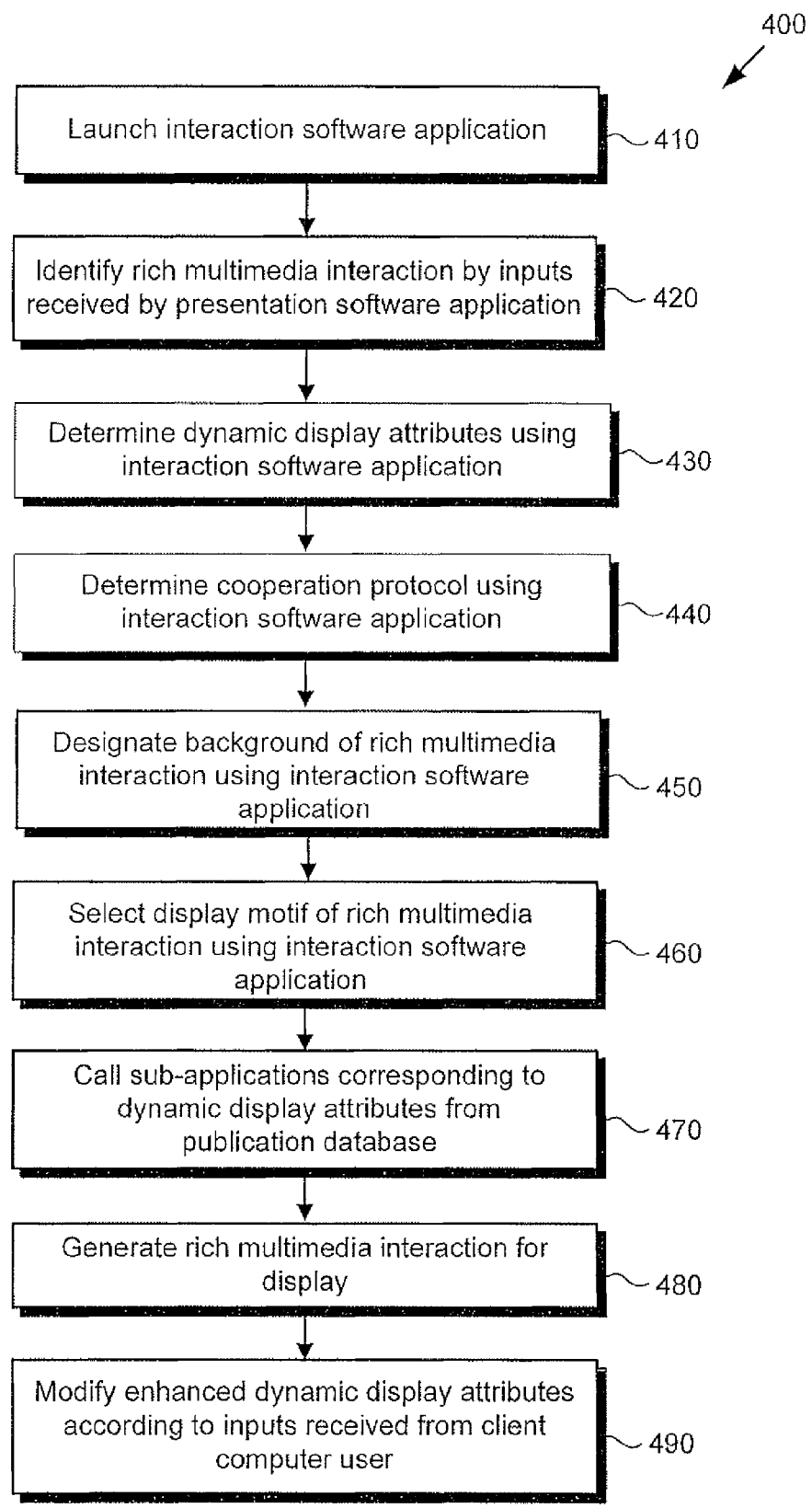
FIG. 4 is a flowchart presenting a method of producing a rich multimedia interaction, according to another embodiment of the present invention.

The present invention will now be further described by FIGS. 3 and 4, which present exemplary methods of producing a rich multimedia interaction. Certain details and features have been left out of flowcharts 300 and 400 that are apparent to a person of ordinary skill in the art. For example, a step may consist of one or more substeps or may involve specialized equipment or materials, as known in the art. While steps 310 through 360, in FIG. 3, and 410 through 490, in FIG. 4, are sufficient to describe particular embodiments of the present method, other embodiments may utilize steps different from those shown in flowcharts 300 and 400, or may include more, or fewer steps.

Beginning with flowchart 300 in FIG. 3, flowchart 300 describes a method that may be utilized by a creator of a rich multimedia interaction, for example. Step 310 of flowchart 300 comprises identifying a theme of the rich multimedia interaction from a plurality of rich multimedia interaction themes. Production of a rich multimedia interaction may include identifying various interactive entertainment channels devoted to specific entertainment content, such as music, television, movies, online chat, and games. In one embodiment, identifying a theme in step 310 may correspond to identifying a particular channel carrying a particular content type, such as a generalized movie channel, or a channel devoted to a specific movie, like the Disney production Ratatouille, or to a family of movies, like the Pirates of the Caribbean movie series. In another embodiment, identifying a theme for the rich multimedia interaction may correspond to selecting a set of channels devoted to a variety of entertainment content and suitable for presentation as alternative interactive entertainments. Identifying a theme in step 310 establishes a template defining display parameters for subsequent rich multimedia interaction production steps. For example, the palette of backgrounds and motifs, and the variety of dynamic display attributes available in subsequent steps may be defined by the particular theme identified in step 310.

The exemplary method of flowchart 300 continues with step 320, which comprises determining dynamic display attributes of the rich multimedia interaction based on the theme. Dynamic display attributes, so named because they represent interactive display elements capable of movement, modification in appearance, and activation by inputs received by the interaction software application, may include both global and context specific dynamic display attributes. A global dynamic display attribute may be an asset that appears in substantially similar form across multiple entertainment content channels, such as an interactive navigation tool, for example, or be an asset shared across interactions devoted to a common type of content, such as a video player appearing in all rich multimedia interactions devoted to movie content. A context specific dynamic display attribute, by contrast, may be special to a particular rich multimedia interaction. As an example of the latter, a rich multimedia interaction devoted to the Disney movie Ratatouille may include a dynamic display attribute in the form of a book having pages that turn in response to user inputs, revealing details of the movie storyline, or insight into its characters.

Flowchart 300 continues with step 330, comprising determining a cooperation protocol governing interplay amongst the dynamic display attributes. Where, as may be the case, a rich multimedia interaction includes several dynamic display attributes, the presentation of those attributes can be enhanced by determination of a coordination protocol establishing rules for the various initial sizes, shapes, and relative movement and/or positions of the dynamic display attributes. When applied to the dynamic display attributes, the cooperation protocol produces enhanced dynamic display attributes compliant with the rules.

Step 340 of flowchart 300 comprises designating a background of the rich multimedia interaction. The background may be selected to harmonize the overall visual impact presented by the interactive experience with the theme identified in step 310. In step 350, a display motif of the rich multimedia interaction is selected. The display motif may establish an aesthetic for presentation of static display assets as well as dynamic display attributes. As specific examples of steps 340 and 350, where a rich multimedia interaction is devoted to the Disney movie Ratatouille, the background may comprise a Parisian cityscape including a view of the Eiffel Tower, whereas selecting a display motif may result in display assets including images of Remy the rat, and Louis XIV adornment of a video player included as a dynamic display attribute.

Moving now to step 360 of flowchart 300, step 360 comprises generating the rich media interaction for display. As described previously in relation to FIG. 2, the sub-applications comprise mini applications invoked by the interaction software application, configured to apply the cooperation protocol to the dynamic display attributes to produce enhanced dynamic display attributes and to adapt the enhanced dynamic display attributes to the display motif and integrate the enhanced dynamic display attributes with the background. The rich multimedia interaction may then be stored in a subsequent step (not shown in FIG. 3). In one embodiment, the rich multimedia interaction produced according to the present method may be stored in publication database 220 and housed on rich multimedia interaction host server 210, in FIG. 2.

Turning now to flowchart 400 in FIG. 4 and system 200 in FIG. 2, flowchart 400 describes a method that may be utilized by a content consumer interacting with a rich multimedia interaction to produce a modified or personalized rich multimedia interaction, for example. Step 410 of flowchart 400 comprises launching interaction software application 214b on client computer 230. As described in conjunction with FIG. 2, interaction software application 214b may be downloaded to client computer 230 and launched in web browser 234, allowing a user of client computer 230 to access publication database 220 via communication link 216.

A user of client computer 230 may then utilize interaction software application 214b to identify a rich media interaction from a plurality of rich media interactions in step 420. Identification of a rich media application may comprise receiving a user input identifying an interactive entertainment channel devoted to movies, from a menu of alternative interactive content selections, for example. Interaction software application 214b may be further utilized to determine dynamic display attributes in step 430 and determine a cooperation protocol governing interplay amongst the dynamic display attributes in step 440, as well as to designate a background 222 in step 450, select a display motif 224 in step 460, and call sub-applications 226 corresponding to the dynamic display attributes from publication database 220 in step 470. In step 480, interaction software application 214b can be used to generate the rich multimedia interaction for display using the sub-applications called in step 470 to produce enhanced dynamic display attributes, and to adapt the enhanced dynamic display attributes to the display motif and integrate the enhanced dynamic display attributes with the background.

Continuing with step 490 of flowchart 400, step 490 comprises modifying the enhanced dynamic display attributes produced in step 480 according to one or more inputs received from a user of client computer 230. One or more enhanced dynamic display attributes may be modified in step 490. Modification of enhanced dynamic display attributes may include manually moving or resizing an enhanced dynamic display attribute, personalizing display settings, or establishing a username and/or password to create a login identification, for example.

Figure 5:
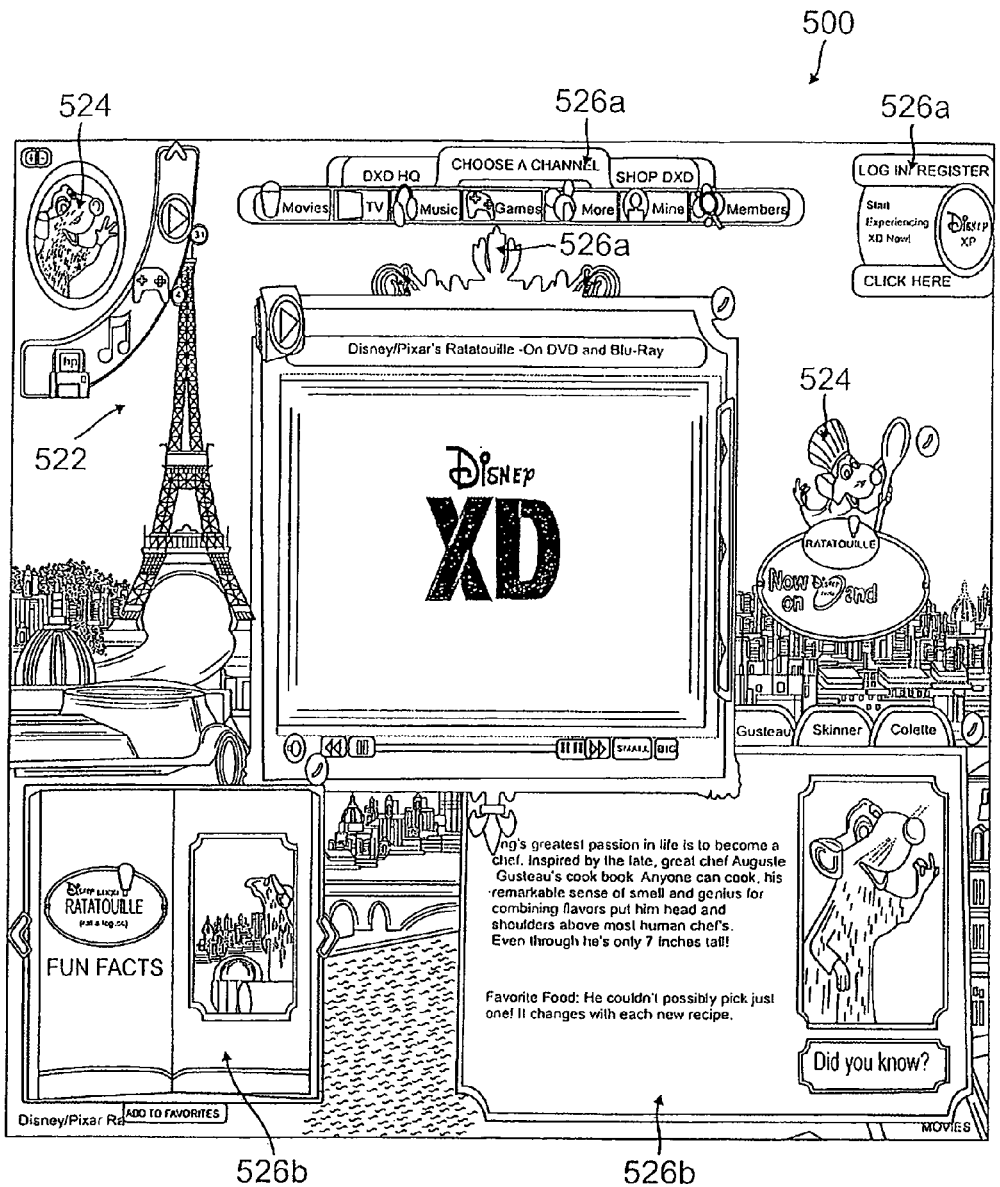
FIG. 5 shows a visual frame of an exemplary rich multimedia interaction in the form of an interactive entertainment channel devoted to the movie Ratatouille, produced according to one embodiment of the present invention.

Turning now to FIG. 5, FIG. 5 shows visual frame 500 of an exemplary rich multimedia interaction in the form of an interactive entertainment channel having the Disney movie Ratatouille as its theme, produced according to one embodiment of the present invention. The rich multimedia interaction represented by visual frame 500 may comprise a Flash movie, for example. As can be seen from FIG. 5, background 522 of visual frame 500 has been designated as a Parisian cityscape to complement the rich multimedia interaction theme. The display motif is indicated by visual assets 524 depicting Remy the rat, a protagonist of the movie. Enhanced dynamic display attributes present in visual frame 500 include enhanced global dynamic display attributes 526*a* and enhanced context specific dynamic display attributes 526*b*. As previously explained, global dynamic display attributes are assets that appear across different entertainment content channels, whether devoted to movies, television, games, or online chat, such as the video player, interactive navigation tool, and login/registration tool shown in FIG. 5. Context specific dynamic display attributes, by contrast, are special to the Ratatouille rich multimedia interaction. As examples of context specific dynamic display attributes, visual frame 500 includes the "Fun Facts" booklet and "Did you know?" tabbed recipe cards responsive to user inputs.

Figure 6:
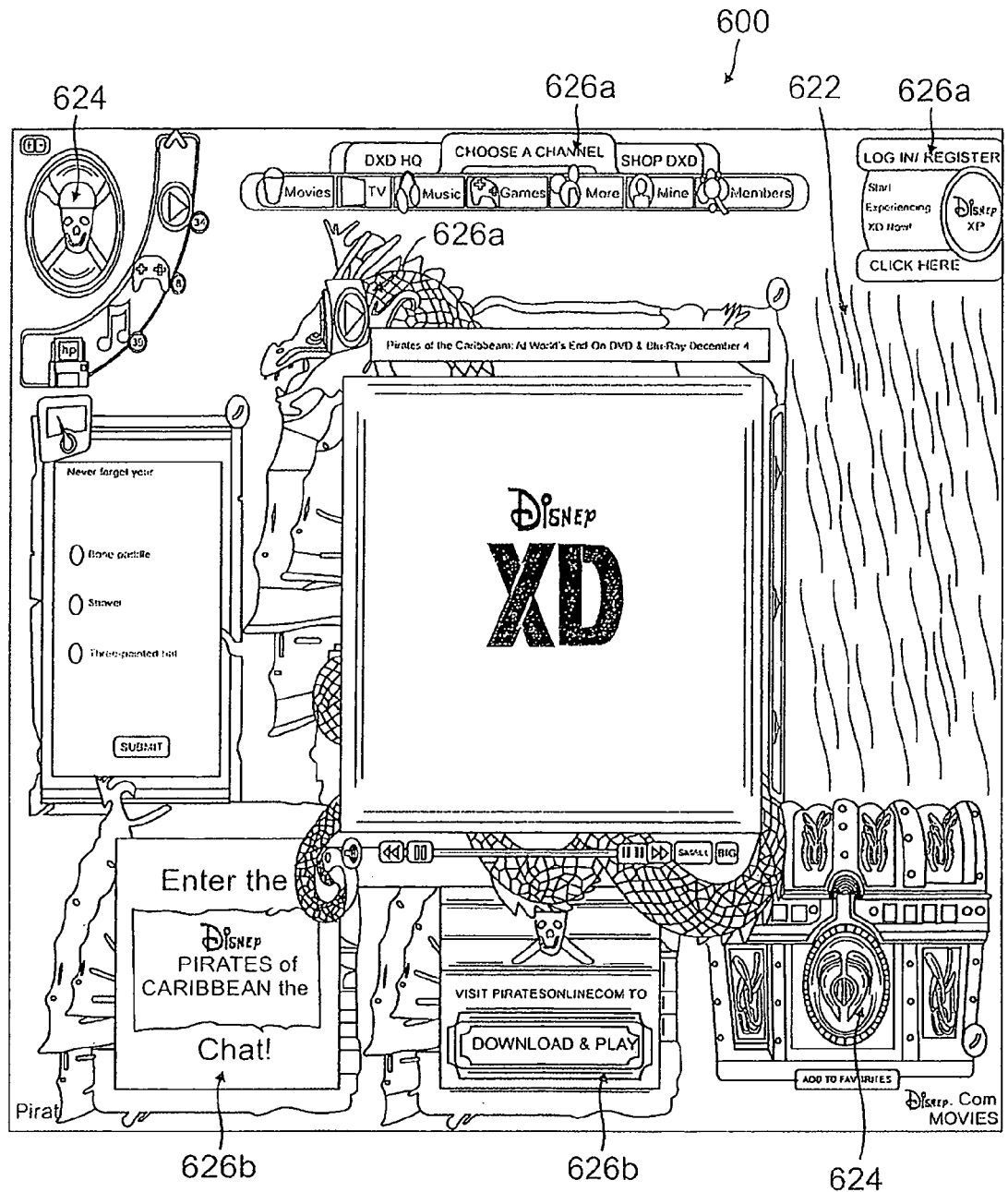
FIG. 6 shows a visual frame of an exemplary rich multimedia interaction in the form of an interactive entertainment channel devoted to the Pirates of the Caribbean movie series, produced according to one embodiment of the present invention.

As another example of rich multimedia interactive content produced according to an embodiment of the present invention, FIG. 6 shows visual frame 600 of an exemplary rich multimedia interaction in the form of an interactive entertainment channel devoted to the Pirates of the Caribbean movie series. As can be seen from FIG. 6, background 622 of visual frame 600 has been designated as an eerie mist to complement the rich multimedia interaction theme. The display motif is indicated by visual assets 624 depicting a skull and crossbones, and a pirate's treasure chest. Enhanced dynamic display attributes present in visual frame 600 comprise enhanced global dynamic display attributes 626*a* including a video player, navigation tool, and login/registration tool, similar to the corresponding enhanced global dynamic display attributes appearing in FIG. 5. FIG. 6 also shows enhanced context specific dynamic display attributes 626*b* including a chat screen and link to an online Pirates of the Caribbean game specific to the rich multimedia interaction represented by visual frame 600. Comparison of FIGS. 5 and 6 reveals some of the variety, complexity, and contextual sensitivity achievable by the embodiments disclosed herein.

Thus, the present application discloses a method and system for producing a rich multimedia interaction. By permitting a user to determine dynamic display attributes and a cooperation protocol governing their interplay, one embodiment of the present invention provides a rich multimedia interaction creator with a powerful and efficient means of defining display parameters. By further allowing the user to produce enhanced dynamic display attributes using sub-applications configured to apply a the cooperation protocol to the dynamic display attributes, and to adapt those enhanced dynamic display attributes to a display motif and integrate them with a background designated by the user, one embodiment of the present invention enables production of a wide variety of rich multimedia interactions. Moreover, the versatility of the sub-applications described in the present application enables rapid development and modification of rich multimedia interactions, permitting that interactive content to remain topical and responsive to changes in user interests.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for producing a rich multimedia interaction on an interaction software application, the method comprising:
   launching, by a processor, the interaction software application to identify the rich multimedia interaction;
   determining dynamic display attributes of the rich multimedia interaction, wherein the dynamic display attributes include global dynamic display attributes and context specific dynamic display attributes;
   determining a cooperation protocol governing interplay amongst the dynamic display attributes; and
   generating the rich multimedia interaction for display, using one or more sub-applications configured to apply the cooperation protocol to the dynamic display attributes to produce enhanced dynamic display attributes.

2. The method of claim 1 further comprising identifying a theme of the rich multimedia interaction from a plurality of rich multimedia themes.

3. The method of claim 1 further comprising designating a background of the rich multimedia interaction.

4. The method of claim 1 further comprising selecting a display motif of the rich multimedia application.

5. The method of claim 1, wherein the dynamic display attributes comprise interactive display elements capable of being moved, modified, and activated by inputs received by the interaction software application.

6. The method of claim 1, wherein the rich multimedia interaction is produced using an Extensible Markup Language (XML) based interaction software application.

7. The method of claim 1 further comprising designating a background and selecting a display motif of the rich multimedia interaction, wherein the one or more sub-applications are further configured to adapt the enhanced dynamic display attributes to the display motif and integrate the enhanced dynamic display attributes with the background.

8. The method of claim 1, wherein the dynamic display attributes of the rich multimedia interaction are based on the theme.

9. The method of claim 1, wherein the rich multimedia interaction comprises one or more interactive entertainment devoted to content selected from the group consisting of music, television, movies, and games.

10. The method of claim 1, wherein the interactive software application is launched on a mobile communication device selected from a group consisting of a mobile telephone, a digital media player, a personal digital assistant (PDA), a wireless computer, and a wireless gaming console.

11. A system for producing a rich multimedia interaction, the system comprising:
   a rich multimedia interaction host server;

a publication database stored on the rich multimedia server, the publication database including one or more sub-applications suitable for use by an interaction software application;

the interaction software application stored on a data storage unit, the interaction software application configured to determine dynamic display attributes of the rich multimedia interaction and a cooperation protocol governing interplay amongst the dynamic display attributes, wherein the dynamic display attributes include global dynamic display attributes and context specific dynamic display attributes; and the one or more sub-applications configured to apply the cooperation protocol to the dynamic display attributes to produced enhanced dynamic display attributes.

12. The system of claim 11, wherein the interaction software application is further configured to identify a theme of the rich multimedia interaction from a plurality of rich multimedia themes.

13. The system of claim 11, wherein the publication database further includes at least one background suitable for use by the interaction software application.

14. The system of claim 11, wherein the publication database further includes at least one display motif for use by the interaction software application.

15. The system of claim 11, wherein the dynamic display attributes comprise interactive display elements capable of being moved, modified, and activated by inputs received by the interaction software application.

16. The system of claim 11, wherein the interaction software application comprises an Extensible Markup Language (XML) based interaction software application.

17. The system of claim 11, wherein the interaction software application is further configured to designate a background and select a display motif of the rich multimedia interaction, wherein the one or more sub-applications are further configured to adapt the enhanced dynamic display attributes to the display motif and integrate the enhanced dynamic display attributes with the background.

18. The system of claim 11, wherein the dynamic display attributes of the rich multimedia interaction are based on the theme.

19. The system of claim 11, wherein the rich multimedia interaction comprises one or more interactive entertainment devoted to content selected from the group consisting of music, television, movies, and games.

20. The system of claim 11 further comprising a client computer, wherein the client computer includes a mobile communication device selected from a group consisting of a mobile telephone, a digital media player, a personal digital assistant (PDA), a wireless computer, and a wireless gaming console.

* * * * *